US005628426A

United States Patent [19]
Doyle et al.

[11] Patent Number: 5,628,426
[45] Date of Patent: May 13, 1997

[54] COOKING DEVICE HAVING HEATABLE WORK SURFACE OF RAISED DOTS

[75] Inventors: Terence O. Doyle, Perrysburg; Paul A. LoGiudice, Toledo, both of Ohio

[73] Assignee: Commercial Aluminum Cookware Company, Toledo, Ohio

[21] Appl. No.: 515,802

[22] Filed: Aug. 16, 1995

[51] Int. Cl.$^6$ .................................................. A47J 37/00
[52] U.S. Cl. .......................... 220/608; 220/912; 99/422; 99/425
[58] Field of Search .............................. 220/608, 912; 99/422, 425, 444, 445

[56] References Cited

U.S. PATENT DOCUMENTS

| | | |
|---|---|---|
| 1,063,911 | 6/1913 | Chadwick . |
| 1,460,380 | 7/1923 | Hughes . |
| 1,644,255 | 10/1927 | Kercher et al. . |
| 2,462,242 | 2/1949 | Webb et al. . |
| 2,618,258 | 11/1952 | Kroyer . |
| 2,765,728 | 10/1956 | Pearce . |
| 3,493,726 | 2/1970 | Bardeau . |
| 3,981,233 | 9/1976 | Nugarus . |
| 4,123,560 | 10/1978 | Hice . |
| 4,533,807 | 8/1985 | Minamida . |
| 4,768,427 | 9/1988 | Cheng . |
| 5,351,608 | 10/1994 | Muchin et al. . |

FOREIGN PATENT DOCUMENTS

| | | |
|---|---|---|
| 0424072A1 | of 0000 | European Pat. Off. . |
| 618324 | of 0000 | United Kingdom . |

OTHER PUBLICATIONS

"Stainless Steel Non–Stick Steelon", (3pgs.); undated.
"Circulon Hard Anodized Anodisé", (3pgs.); undated.
"T–Fall" (4pgs.); undated.

*Primary Examiner*—Steven M. Pollard
*Attorney, Agent, or Firm*—Shlesinger, Arkwright & Garvey LLP

[57] ABSTRACT

A cooking device, such as a frying pan, includes a base having a heat-receiving surface and a heat conductive surface. The heat conductive surface is thermally connected to the heat receiving surface, and a plurality of raised dots are provided on the conductive surface. A substantially flat valley is disposed between ones of the plurality of raised dots. In one embodiment of the invention the cooking device includes a non-stick surface on the raised dots.

29 Claims, 2 Drawing Sheets

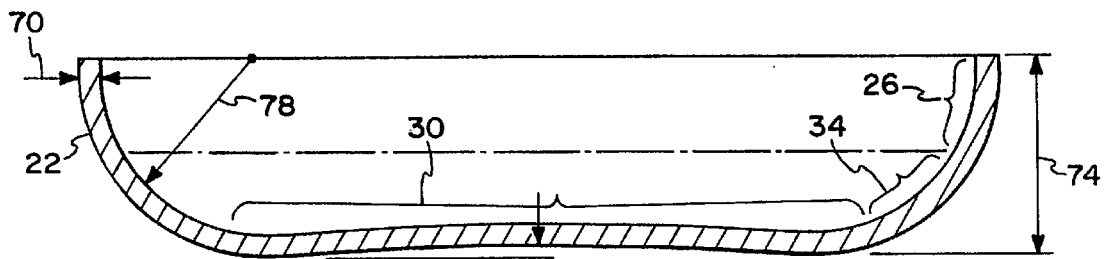
FIG. 4
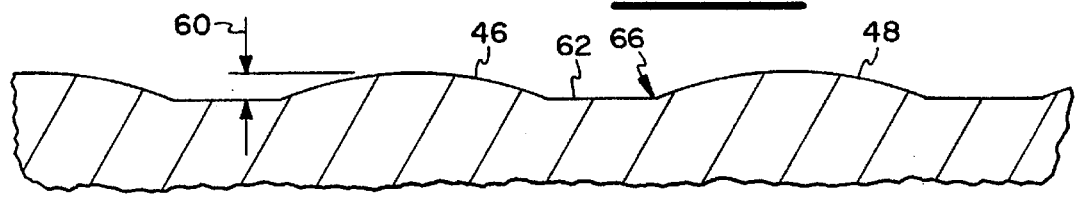
FIG. 5
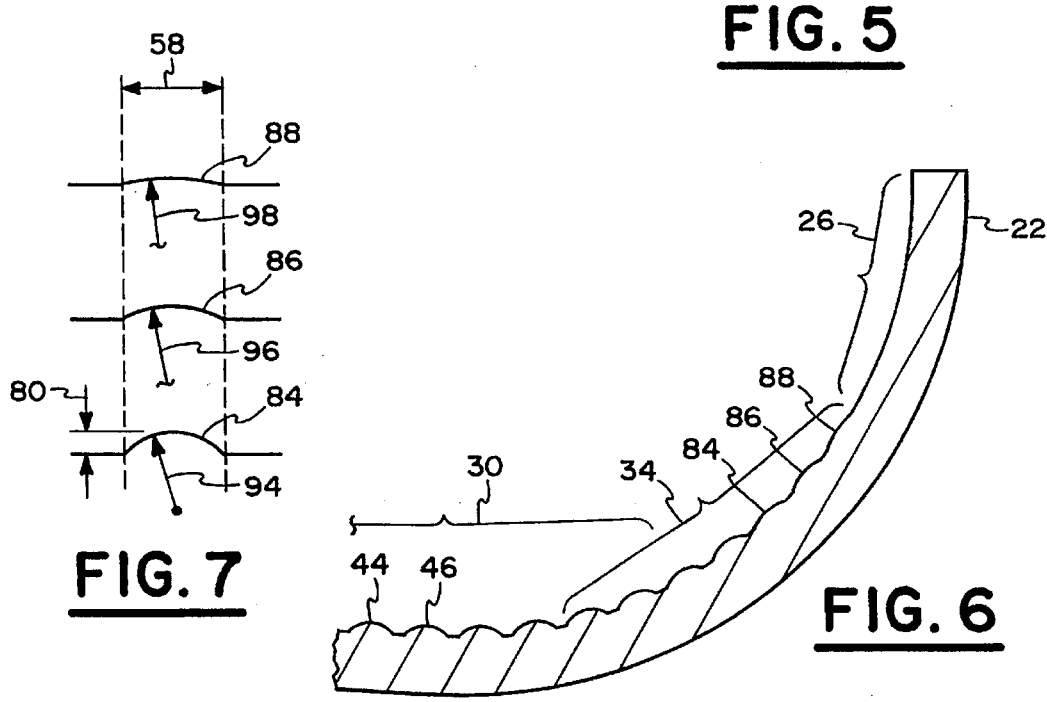
FIG. 7
FIG. 6
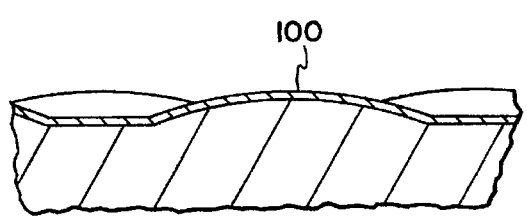
FIG. 8
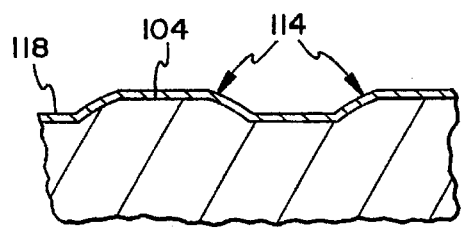
FIG. 9

COOKING DEVICE HAVING HEATABLE WORK SURFACE OF RAISED DOTS

FIELD OF THE INVENTION

This invention relates to a work surface. In particular, this invention is related to a heatable work surface suitable for heating or cooking a product disposed on the work surface, whereby the product is easily moved relative to the surface and removed from the surface, as required.

BACKGROUND OF THE INVENTION

Heatable work surfaces have long been used in fields from home cooking to industrial chemistry.

In the field of cooking, after centuries of using simple cookware having metal surfaces to prepare food, rapid increases in cookware surface technology have been achieved this century.

Such recent improvements include refinements in the metals used as the base material for the cookware, variations in the configuration and texture of the cooking surfaces, and the addition of so-called "non-stick" surfaces. An example of such non-stick surfaces is the application of TEFLON® (Polytetrafluoroethylene (PTFE), DuPont Corp.) as a coating on the working surface of a piece of cookware. Such non-stick coatings have also been used on the cooking utensils which engage the working surfaces of the cookware; for example, TEFLON®-coated spatulas.

An ongoing problem has been that heat dissipation from the work surface to the food being prepared is often diminished by the application of a non-stick coating to the work surface.

Still further, most non-stick coatings tend to wear off through use, even when utensils having non-stick coatings thereon are used in conjunction with the coated cookware.

Examples of known pieces of cookware include: U.S. Pat. No. 1,063,911 to Chadwick; U.S. Pat. No. 1,460,380 to Hughes; U.S. Pat. No. 1,644,255 to Kercher et al.; U.S. Pat. No. 2,462,242 to Webb et al.; U.S. Pat. No. 2,618,258 to Kroyer; U.S. Pat. No. 2,765,728 to Pearce; U.S. Pat. No. 3,493,726 to Bardeau; U.S. Pat. No. 3,981,233 to Nugarus; U.S. Pat. No. 4,123,560 to Hice; U.S. Pat. No. 4,533,807 to Minamida; U.S. Pat. No. 4,768,427 to Cheng; and U.S. Pat. No. 5,351,608 to Muchin et al.

Other examples include published British (GB) patent specification No. 618,324 of Feb. 21, 1949; Netherlands (NL) Patent No. 86009, published Aug. 15, 1957; and published European (EP) patent application No. 0 424 072, dated Apr. 24, 1991.

Although each of those patented devices undoubtedly works for its intended purpose, there is a need for a heatable work surface which overcomes the drawbacks of those prior art devices. There is a need for a heatable work surface which dissipates heat readily to foods being prepared, for example, which releases cooked food easily, and which also is easily cleaned. There is likewise a need for such a work surface to accept and retain a non-stick surface, even under prolonged use.

OBJECTS AND SUMMARY OF THE INVENTION

Accordingly, it is an object of the invention to provide a heatable work surface which overcomes the drawbacks and disadvantages of the prior art devices.

Another object of the invention is to provide a heatable work surface which distributes and dissipates heat quickly and evenly.

Yet another object of the invention is to provide a heatable work surface which releases food more readily than known devices. A still further object of the invention is to provide a heatable work surface which is more easily cleaned and, hence, more hygienic than known devices. A further object of the invention is to provide a heatable work surface which can be coated with a non-stick coating.

Another object of the invention is to provide a heatable work surface which is configured to reduce wear of a non-stick coating provided thereon.

A still further object of the invention is to provide a heatable work surface which concentrates wear of the non-stick surface at certain points, leaving the remainder of the surface protected.

A yet further object of the invention is to provide a heatable work surface which functions well even as the non-stick surface wears.

Yet another object of the invention is to provide a heatable work surface offering less resistance to utensils used thereon.

A further object of the invention is to provide a heatable work surface which induces less wear on utensils used against the work surface.

Another object of the invention is to provide a heatable work surface which is both easily and effectively cleaned.

A still further object of the invention is to provide a heatable work surface which has superior conductive and radiant properties for achieving the desired heating of materials, such as food, placed thereon.

A yet still further object of the invention is to provide a heatable work surface which is more durable than known devices.

It is yet another object of the invention to provide a piece of cookware having a heatable work surface according to the invention that is easier to use and to clean than known cookware.

Another object of the invention is to provide a piece of cookware having a cooking surface free of crevices, pockets, and other debris-retaining surface irregularities.

A still further object of the invention is to provide a frying pan incorporating a heatable work surface according to the invention that uses less oil when cooking and frying objects than known frying pans.

In summary, therefore, the invention is directed to a cooking device comprising a base having a heat-receiving surface and a heat conductive surface. The heat conductive surface is thermally connected to the heat receiving surface, and a plurality of raised dots are provided on the conductive surface. A substantially flat valley is disposed between at least some of adjacent ones of the plurality of raised dots.

In one embodiment of the invention the cooking device is configured as a frying pan.

The invention will be further described with reference to the following drawings.

It is to be understood that relative terms such as left and right, up and down, are for convenience only and are not intended to be limiting. Likewise, terms such as frying pan and cookware are used for convenience, as all manners of sauce pans, omelette pans, pots, and griddles, as well as industrial surfaces which may be used for heating materials other than food to be cooked are intended to be within the scope of the invention. The term "dot" refers to a raised element, which may be a raised, radiused dot, for example.

BRIEF DESCRIPTION OF THE DRAWINGS

FIG. 4 is a side, sectional view of the frying pan of FIG. 1;

FIG. 5 is a portion of FIG. 4, showing raised dots found on the base thereof, on an enlarged scale;

FIG. 6 is a portion of FIG. 4, on an enlarged scale, showing a portion of the base and sidewall thereof;

FIG. 7 schematically illustrates a progressive increase in the radius of the raised dots as the raised dots are placed further up the sidewall of the frying pan, as best seen in FIG. 6;

FIG. 8 is a view similar to FIG. 5, illustrating another preferred embodiment of the invention in which a non-stick coating is provided on the raised dots; and FIG. 9 is a view similar to FIG. 8, illustrating a further preferred embodiment of raised dots provided on the base of a cooking surface, in which the tops of the dots have been flattened.

DETAILED DESCRIPTION OF THE INVENTION

FIGS. 1–7 illustrate a preferred embodiment of a frying pan 10 provided with a raised dot pattern 14 according to the invention.

Figure 1:
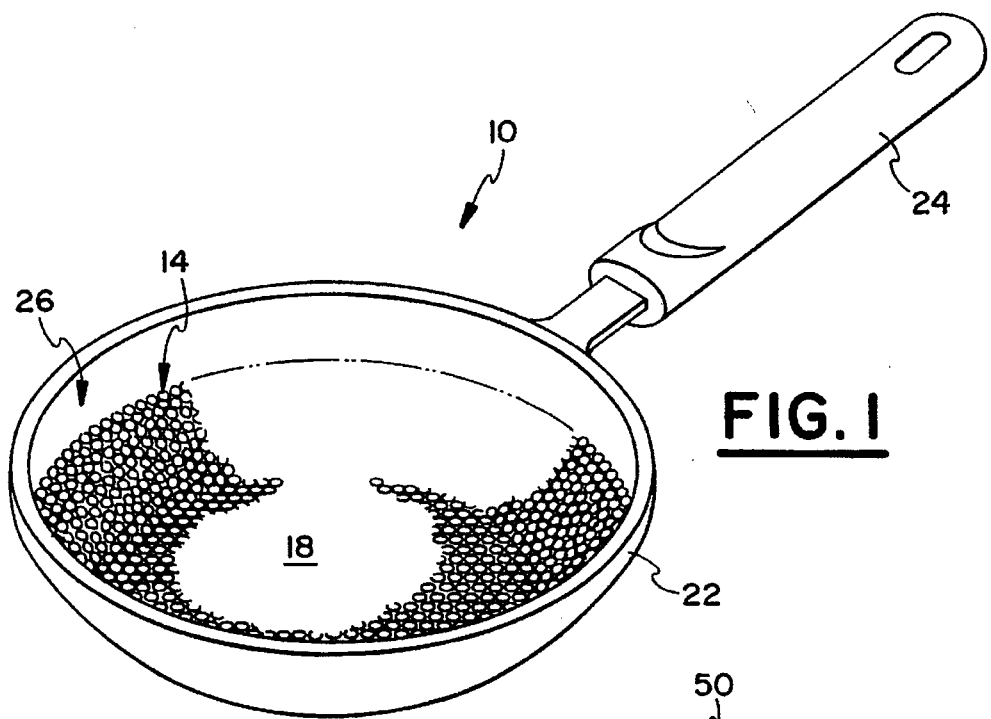
FIG. 1 is a perspective view of a frying pan incorporating a heatable work surface according to a preferred embodiment of the invention.
Figure 3:
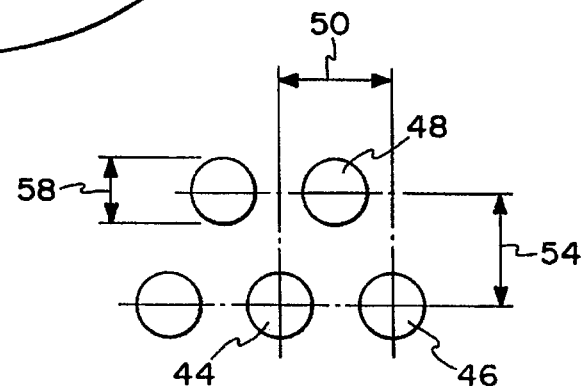
FIG. 3 is a partial, schematic view of a portion of the raised dot pattern of FIG. 2.
Figure 2:
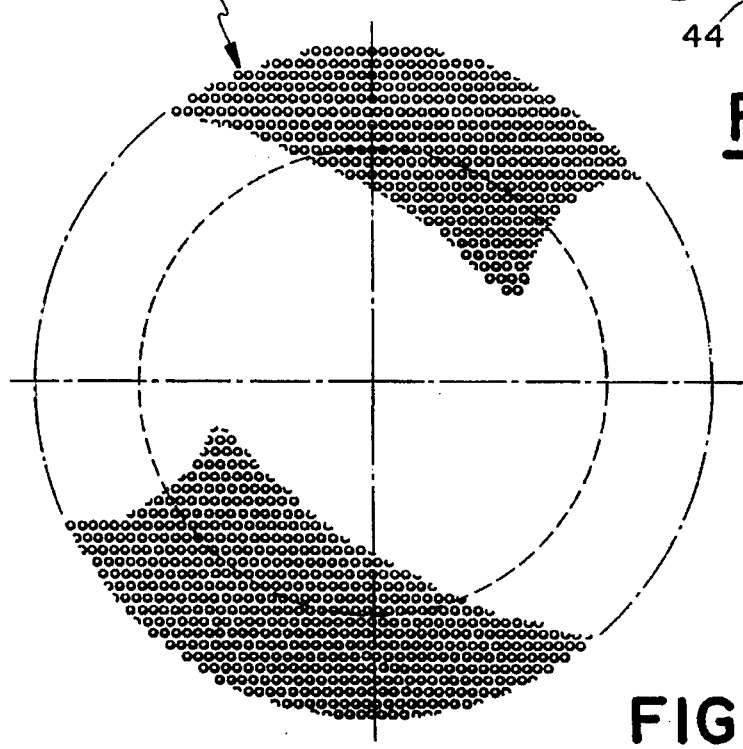
FIG. 2 is a top plan view of a pattern of raised dots of the embodiment of FIG. 1.

Good results have been achieved when raised dot pattern 14 is provided on a base 18, as well as in at least a portion of a side wall 22. The term "pattern" is for convenience, as the raised dot pattern 14, best appreciated from considering FIGS. 2, 3, and 5, is merely an example of the manner in which individual raised dots can be arrayed relative to each other. Preferably, the raised dot pattern 14 includes raised, radiused dots, as illustrated.

The factors which contribute to the effectiveness of the raised dot pattern 14 will be more fully understood from the following description of the characteristics of the individual raised dots and from the raised dot pattern 14 collectively.

Frying pan 10 includes a base 18 and a sidewall 22 having a handle 24 attached thereto and a substantially dot-free supplemental region 26 defined thereon.

A central portion of raised dot pattern 14 is referred to as a first or cooking region 30, as foods will often be subjected to the greatest amount of heat in cooking region 30.

A transition or second region 34 is provided between cooking region 30 and supplemental or third region 26. Transition region 34 preferably includes a plurality of raised dots which preferably both decrease in height and have increased radiuses of curvature as such raised dots are located further up on sidewall 22, as will be described in greater detail with reference to FIGS. 6 and 7 below.

Base 18 of frying pan 10 may be higher in the middle than at the edges, such as shown by a height difference 36 in FIG. 4. so that, when frying pan 10 is heated, base 18 substantially flattens out.

Good results have been achieved when the raised dot pattern 14 includes individual dots such as a dot 44, a dot 46, and a dot 48, in which illustrative dot 44 is spaced from dot 46 at a distance 50, while exemplary dot 46 is spaced from dot 48 at a spacing 54.

Dot spacing 50 may be set substantially equal to dot spacing 54, and dots 44 and 46 may be offset left to right from dot 48 so that a somewhat triangular or diagonal overall pattern results.

A successful frying pan has been made in which a diameter 58 of individual raised dots was set at about 2.0 millimeters (mm), spacing 50 was set at about 2.8 mm, and spacing 54 was set at about 2.8 mm. A height 60 of typical raised dot 46 above a flat portion or valley 62 was set at about 0.19 mm in that working example, with the top of the raised dot being somewhat flat. A transition 66 between raised dot 48 and flat valley 62 may also be rounded or "radiused". Even when no "radiusing" of this transition is done, given the low angle at which the surface of raised dot 48 intersects flat valley 62, good results are achieved owing to the angle defined therebetween being sufficiently large to prevent the entrapment of debris and to ensure easy release of foods being cooked.

In that working example of frying pan 10 according to the invention, a thickness 70 of the wall was about 3.90 mm, a height 74 was about 37.50 mm, the width or diameter of substantially flat face 18 was about 107.95 mm, the inner diameter measured at the upper free edges was about 171.45 mm, and an inner radius 78 defining sidewalls 22 was about 31.75 mm.

FIGS. 6 and 7 illustrate in greater detail the manner in which a sidewall raised dot height 80 decreases as one considers individual raised dots when moving from cooking region 30 through transition region 34, until supplemental region 26 is substantially dot free.

Sidewall dot height 80 of a sidewall dot 84 located in transition region 34 has a radius of curvature 94 typically less than the radius of curvature of a raised dot in cooking region 30. By maintaining dot diameter 58 substantially constant, that is, substantially the same as dot diameter 58 of a dot in cooking region 30, it will be appreciated that sidewall dot height 80 will be less than base dot height 60 when the radius 94 of sidewall dot 84 is greater than the radius of the base dot.

An illustrative raised dot 86 further up sidewall 22 away from cooking region 30 has a height less than height 80 when its associated radius 96 is greater than radius 94 of raised dot 84. Likewise, an illustrated uppermost raised dot 88 having a radius of curvature 98 larger than radius 96, has a height which is even less than that of dot 86 given that diameter 58 has been held constant.

It is likewise contemplated that the diameter of the dots will decrease as the dots are located further up the sidewall away from cooking region 30.

FIG. 8 illustrates a still further preferred embodiment of the invention, in which a non-stick coating 100, which may be made from TEFLON® brand PTFE, for example, is provided on the raised dots in cooking region 30.

Good results have been achieved when non-stick coating 100 is provided on the entire interior of frying pan 10; i.e., on cooking region 30, transition region 34, and supplemental region 26.

FIG. 9 illustrates another preferred embodiment of the invention in which a top 104 of a raised, radiused dot 114 has been flattened. A non-stick coating 118 may be provided as in the embodiment of FIG. 8.

Good results have been achieved when a frying pan according to the invention was formed from a flat aluminum disk that was embossed with the raised dot pattern, formed and deburred, grit blasted on the pan interior, hard anodized, and then provided with a non-stick coating on the pan interior.

Method of Production

A piece of cookware, such as frying pan 10 may be successfully produced as follows.

Preferably, one rolls a piece of stock material, such as aluminum, to the desired thickness. A blank, such as a round disk in the case of frying pan 10, is cut out of the rolled aluminum stock. Raised dot pattern 14 is embossed on such flat blank. The embossed blank is then stamped into the desired shape. The embossing and stamping steps may be performed in a single operation.

The stamped, embossed blank is then grit blasted. The grit blasting need be performed only on the interior of frying pan 10. The stamped embossed blank is then hard anodized. Typically, the entire frying pan interior and exterior will be anodized by placing such in an anodizing solution for a predetermined period of time.

The cooking region 30, and preferably, the entire interior of frying pan 10 is then coated with a non-stick material.

Typically, only the interior of frying pan 10 will be grit blasted, and the exterior will be polished.

The grit blasting is preferably carried out prior to the step of hard anodizing. Exemplary grit blasting specifications: 250 to 320 RMS.

The hard anodizing has been successfully carried out with the following specifications. Hardness of surfaces: KNOP 50–60 C Rockwell; surface wear: Load 50 grams; surface abrasion: MILL SPEC 8625 E; and film thickness: 1 to 1.5 mil.

The step of applying a non-stick surface has been successfully carried out to a two coat system supplied by Coatings and Chemicals Corporation of Chicago, Ill., product code: X4862 W/B Marrlite black basecoat; and X4892 W/B Chemlon black sparkle topcoat. That two coat product is more durable than one coat release systems, and is preferably applied over grit blasted and anodized substrates in order to increase the durability of the coating. That two coat system is engineered to provide excellent non-stick or "release" qualities as well as good abrasion resistance.

Use and Operation

One may use frying pan 10 of the preferred embodiment of FIGS. 1–7 in basically the same manner as one uses a conventional frying pan; however, the user may wish to modify his or her conventional manner of using frying pans in order to take advantage of the efficiencies of frying pan 10.

For example, in a case where the user is preparing an omelette, the user first places frying pan 10 on a conventional heating element, such as the gas burner of a stove. In order to obtain the same cooking effect of the omelette, the temperature of the heating element may be reduced, owing to the more efficient heat transfer from cooking region 30 to the omelette owing to the configuration and spacing of the raised dots in dot pattern 14 and the greater total surface area of cooking region 30.

When oil is added prior to the addition of the beaten egg to become an omelette, less oil may be used thanks to the better and more even distribution of the oil resulting from the configuration and spacing of the raised dots in dot pattern 14. It has been found that the rounded raised dots and flat valleys 62 therebetween promote even distribution of cooking oils.

When heating and cooking of the omelette has begun, the user may notice that less effort is required to push the utensil against the rounded raised dots of cooking region 30 for moving cooked egg away from cooking region 30 and allowing uncooked egg to come in contact therewith.

During movement of the utensil downwardly along the inner face of sidewall 22 in supplemental region 26, the user will likely notice the smooth interface between supplemental region 26, the snag-free movement of the utensil within transition region 34, and the smooth movement of the utensil from transition region 34 to cooking region 30.

After the omelette has been cooked, the cleaning of the interior of frying pan 10 is quicker and more thorough than the cleaning of conventional textured surface frying pans owing to raised dot pattern 14. The rounded surfaces of each of the raised dots in all regions of frying pan 10 ease cleaning. Still further, flat valleys 62 and transitions 66 presenting wide, easily cleaned openings having the added benefit of being accessible from multiple directions enhance the cleanability thereof.

Still further, pieces of food and other debris are not retained in the interior of frying pan 10, owing to the virtual absence of abrupt changes of curvature in the cooking surface of our invention. In other words, the interior of frying pan 10 is free of food-retaining crevices, narrow, sharply angled valleys, and pockets and grooves from which debris is not easily dislodged owing to the lack of accessibility thereto.

The use of the preferred embodiment of FIG. 8 having non-stick coating 100 covering the exterior of raised dot pattern 14 is substantially the same as in the other preferred embodiment.

The lack of abrupt changes of curvature as in conventional frying pans also reduces the amount of wear to non-stick coating 100.

Even if portions of non-stick coating 100 are worn off under extended and/or prolonged use, such wear will be minimal, and continued use will be possible owing to the high ratio of non-worn-off surfaces to worn-off surfaces. That is, the unworn flat valleys 62 and unworn sides of the raised dots would still constitute the majority of the cooking surface area.

During cleaning of the omelette pan of the embodiment of FIG. 8 having non-stick coating 100 on the dot pattern thereof, the smooth transitions will enhance the cleanability thereof, as in the above described embodiment. Still further, the smooth transitions between supplemental region 26 and transition region 34 eliminates the wear of the non-stick coating experienced in prior art frying pans during cleaning as no abrupt changes in curvature present themselves to be abraded by cleaning pads, for example.

During use of the preferred embodiment of FIG. 9, it has been found that the flattened tops 104 enhance the wear-resistance of non-stick coating 118. Even if the user modifies none of his or her cooking habits, flattened tops 104 of the raised, radiused dots 114 concentrate wear of the non-stick coating at the tops of raised dots 114 and reduce wear of the non-stick coating 118 on the remainder of the surface.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

We claim:

1. A cooking device, comprising:
   a) a base;
   b) said base including a heat-receiving surface and a heat-conductive surface;
   c) said heat-conductive surface being thermally connected to said heat-receiving surface;
   d) a plurality of raised dots provided on said heat-conductive surface; and
   e) a valley disposed between at least some of said plurality of raised dots;
   f) said plurality of raised dots defining a cooking region on said heat-conductive surface;
   g) a substantially dot-free supplemental region provided adjacent said cooking region;
   h) a transition region disposed between said cooking region and said supplemental region; and
   i) ones of said raised dots in said transition region having heights relative to said valley that are highest adjacent to said cooking region and lowest adjacent to said supplemental region.

2. A cooking device as in claim 1, wherein:
   a) a flat valley is disposed between adjacent ones of said plurality of raised dots.

3. A cooking device as in claim 1, wherein:
   a) a non-stick layer is provided on said heat-conductive surface.

4. A cooking device as in claim 1, wherein:
   a) a sidewall extends from said base and includes said supplemental region.

5. A cooking device as in claim 1, wherein:
   a) said supplemental region extends transversely to said heat-conductive surface.

6. A cooking device, comprising:
   a) a base;
   b) said base including a heat-receiving surface and a heat-conductive surface;
   c) said heat-conductive surface being thermally connected to said heat-receiving surface;
   d) a plurality of raised dots provided on said heat-conductive surface; and
   e) a valley disposed between at least some of said plurality of raised dots;
   f) said plurality of raised dots defining a first, cooking region on said heat-conductive surface;
   g) ones of said plurality of raised dots in said first region having a first height extending away from said valley;
   h) a second region disposed outwardly of said first region;
   i) ones of said raised dots in said second region having a second height extending away from said valley; and
   j) said first height being greater than said second height.

7. A cooking device as in claim 6, wherein:
   a) a transition region is disposed between said cooking region and said second region; and
   b) ones of said raised dots in said transition region have heights relative to said flat valley that are highest adjacent to said cooking region and lowest adjacent to said second region.

8. A cooking device as in claim 7, wherein:
   a) a sidewall extends from said base and includes said transition region.

9. A cooking device as in claim 6, wherein:
   a) ones of said plurality of raised dots in said cooking region have an outer surface defining a first radius of curvature; and
   b) ones of said plurality of raised dots in said second region have an outer surface defining a second radius of curvature.

10. A cooking device as in claim 9, wherein:
    a) said second radius of curvature is greater than said first radius of curvature.

11. A cooking device as in claim 1, wherein:
    a) a sidewall extends from said base.

12. A cooking device as in claim 1, wherein:
    a) said base includes a metal.

13. A cooking device as in claim 1, wherein:
    a) said raised dots are substantially rounded.

14. A cooking device as in claim 1, wherein:
    a) said raised dots are substantially semispherical.

15. A cooking device as in claim 14, wherein:
    a) a substantially flat valley extends between adjacent ones of said plurality of raised dots.

16. A cooking device as in claim 1, wherein:
    a) said raised dots are aluminum.

17. A cooking device as in claim 1, wherein:
    a) said base includes a sidewall; and
    b) said base and sidewall define a frying pan.

18. A cooking device as in claim 1, wherein:
    a) said raised dots are substantially free of abrupt changes in curvature.

19. A cooking device as in claim 1, wherein:
    a) said base includes a sidewall; and
    b) said base and sidewall define a sauce pan.

20. A cooking device as in claim 1, wherein:
    a) said base includes a sidewall; and
    b) said base and sidewall define an omelette pan.

21. A cooking device as in claim 1, wherein:
    a) said base includes a grit-blasted, hard anodized aluminum.

22. A cooking device as in claim 21, wherein:
    a) a non-stick layer is provided on said heat-conductive surface.

23. A cooking device as in claim 1, wherein:
    a) at least some of said plurality of raised dots have substantially flat tops.

24. A cooking device as in claim 6, wherein:
    a) a flat valley is disposed between adjacent ones of said plurality of raised dots in said first region.

25. A cooking device as in claim 6, wherein:
    a) a substantially dot-free supplemental region is provided adjacent said second region; and
    b) a sidewall is disposed adjacent said second region and includes said supplemental region.

26. A method of producing a cooking device, comprising the steps of:
    a) providing a flat blank;
    b) embossing a plurality of raised dots on the flat blank;
    c) providing a valley between at least some of adjacent ones of the plurality of raised dots in a cooking region;
    d) providing a substantially dot-free supplemental region adjacent the cooking region;
    e) providing a transition region between the cooking region and the supplemental region;
    f) providing a valley between at least some of adjacent ones of the plurality of raised dots in the transition region; and g) forming ones of the raised dots in the transition region to have heights relative to the valley that are highest adjacent to the cooking region and lowest adjacent to the supplemental region.

27. A method of making a cooking device as in claim 26, further comprising the step of:

a) providing a non-stick coating on the plurality of raised dots and the valley.

28. A method of making a cooking device as in claim 27, further comprising the step of:

a) forming the blank into a cookware defining a concave interior having the plurality of raised dots on the interior thereof.

29. A method of making a cooking device as in claim 27, further comprising the step of:

a) grit blasting and hard anodizing the plurality of raised dots and the valley prior to the step of providing a non-stick coating.

* * * * *